United States Patent Office 3,009,834
Patented Nov. 21, 1961

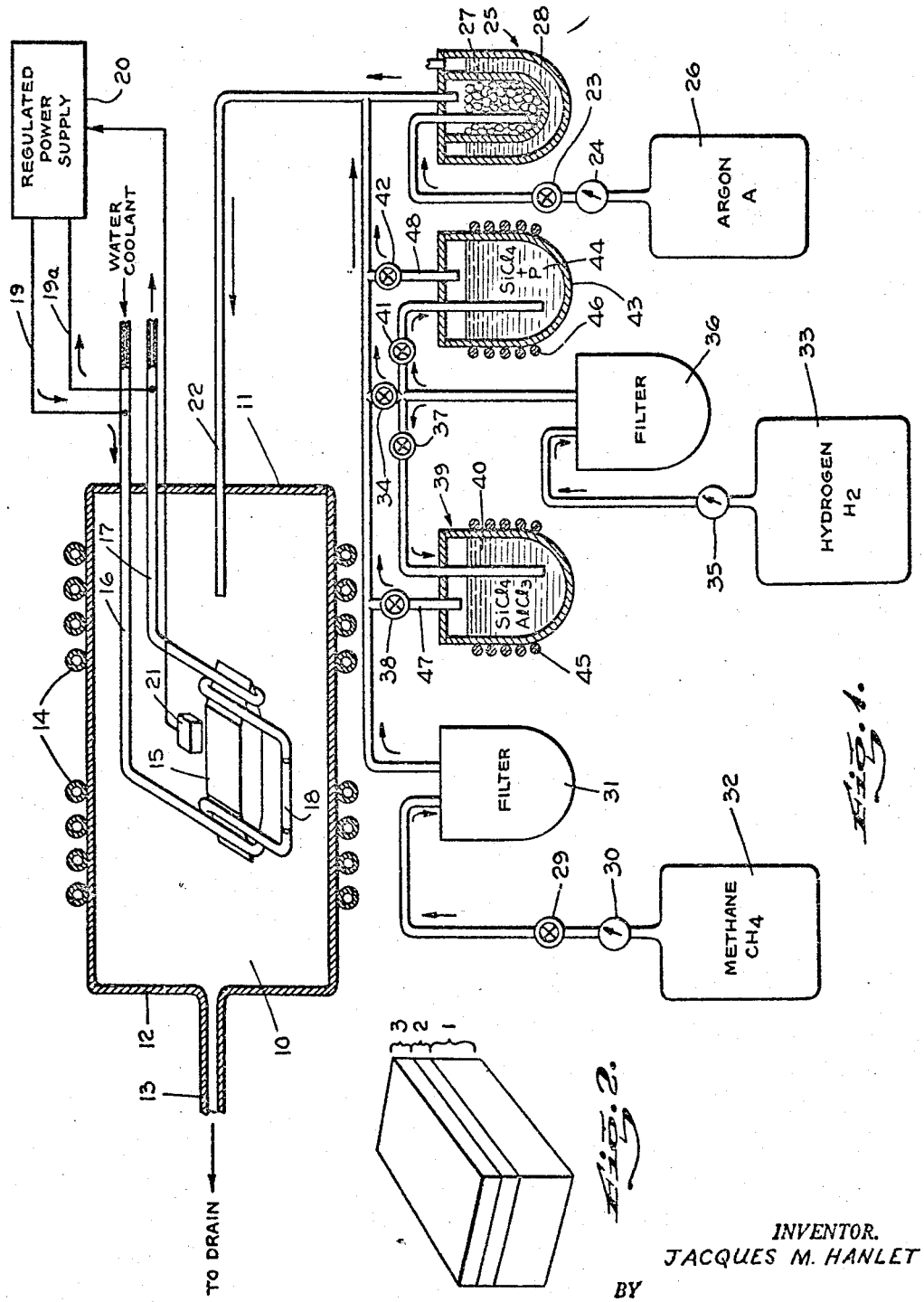

3,009,834
PROCESS OF FORMING AN ELECTROLUMINESCENT ARTICLE AND THE RESULTING ARTICLE
Jacques M. Hanlet, Pacific Palisades, Calif.,
assignor to Lear, Incorporated
Filed Oct. 29, 1959, Ser. No. 849,619
25 Claims. (Cl. 117—215)

This invention relates to electroluminescent material, and more particularly to electroluminescent material responsive to a direct current electrical voltage.

In the past, electroluminescent materials have only been produced to respond to an alternating current and the past electroluminescent material requires a very high voltage to thickness ratio.

The life of the electroluminescent material is dependent upon the frequency of excitation as well as the applied voltage. The reason for the life limitation of the electroluminescent material excitation field effect is found in the ionic structure of these materials. The action of the excitation field as well as the frequency on such material results in a slow migration of the ions in the crystal. These ions are the source of electroluminescence in a general sense either because they provide the electrons that will be accelerated by the alternating current field or the empty centers that will capture the accelerated electrons. Since the ions can be displaced out of the crystal, their disappearance will decrease the probability of light emission. Therefore, using an alternating current of relatively high voltage or of high frequency, shortens the life of the electroluminescent material.

It is therefore an object of this invention to provide an electroluminescent material and method for coating a substrate to make said material which does not have the above-mentioned disadvantage.

It is another object of this invention to provide an electroluminescent material which will emit light when a relatively low direct current electrical voltage is applied across the material.

Still another object of this invention is to provide an electroluminescent material which has a high response frequency.

A further object of this invention is to provide an electroluminescent material which has a long life.

Other objects and a better understanding of the invention will become apparent from the following description when taken in conjunction with the drawings in which:

FIGURE 1 is a diagram of the apparatus used to form the present invention; and

FIGURE 2 is an enlarged perspective view of a typical electroluminescent element.

As illustrated in FIGURE 2, the electroluminescent material has three layers. The first layer is composed of silicon and carbon molecules and also phosphorus atoms. The second layer contains silicon and carbon molecules and also aluminum atoms. The second layer has fewer carbon atoms than the first layer. The third layer also contains silicon and carbon molecules and aluminum atoms. The third layer has more carbon atoms than the second layer. The present invention is an electroluminescent material which will emit light when a continuous electrical voltage is applied to the material. The material described in the present invention has essentially a covalent binding as opposed to the ionic binding of the alternating current electroluminescent material, thus making the present invention much more stable and longer lasting.

Referring now to FIGURE 1 for a more detailed detailed description of the invention, there is shown a container 10, e.g., a quartz flask, having one end 11 which has openings for a series of tubes and wires and a second end having a drain outlet 13. The container 10 has a series of cooling coils 14 wound around the outside thereof. A piece of conductive material 15, e.g., a carbon slab, is held in the container by the copper tubes 16 and 17. The copper tubes contact the ends of the slab 15 and hold the slab in place. The continuation or connecting portion 18 between the copper tubes 16 and 17 is made of a nonconductive material. The tubes 16 and 17 are connected by the electrical leads 19 and 19a respectively to a regulated power supply 20. The tubes 16 and 17 are also connected to a water supply to provide a cooling action on the tubes themselves, otherwise the current would possibly melt the tubes. It can be seen now that as the power supply generates electrical current, the current is conveyed through the electrical connection 19 to the copper pipe 16, through the slab 15, to the other copper pipe 17, then to the other electrical connection 19a and back to the power supply. Note that the insulative connection 18 allows the water to pass through both of the tubes, but does not allow an appreciable amount of current to pass, thereby forcing the bulk of the current to flow through the resistive slab 15. The purpose of supplying the electrical current to the slab is to heat the slab. The power supply is regulated by a thermocouple 21 and a manual adjustment (not shown) on the power supply 20. It has been found that the thermocouple 21 functions more accurately when placed away from the slab 15 and when the thermocouple 21 is acted upon by the radiated heat of the slab 15. The thermocouple 21 and the manual adjustment of the power supply 20 are used to select and maintain the slab 15 at the desired temperature. The temperature is dictated by the particular step of the process in making the electroluminescent material. It is also possible to check the temperature of the slab 15 by using an optical pyrometer.

An input tube 22 is positioned near the end of the flask 10 and passes through the end 11 of the flask 10. The tube 22 may be placed anywhere in the flask so long as the gases from the tube 22 are dispersed uniformly when they pass over the slab 15. Note that the flask 10 is sealed off to the atmosphere at the end 11 and that the outlet drain 13 is open to the atmosphere or a suitable drain. It can be seen now that if a flow of gases enters the flask 10 through the input tube 22 and the rate of flow and pressure of the gases in the tube 22 is sufficient to maintain the pressure in the flask 10 higher than the pressure in the drain tube 13, no impurities enter the flask through the outlet drain 13. Connected to the input tube 22 by way of shut off valve 23, flowmeter 24, and filter 25 is a source of pure argon 26 in the gaseous state and at room temperature. The filter 25 filters the moisture out of the argon before the argon enters the input tube 22. The filter 25 has the input tube passing down through a drying agent 27, such as charcoal, so that the argon passes through the drying agent before leaving the filter 25. A cooling agent 28, such as liquid nitrogen, surrounds the inner portion of the filter 25 and cools the drying agent to aid in the extracting of the moisture from the argon. The moisture in the argon condenses and is absorbed by the charcoal. Also connected to the input tube 22 by way of valve 29, flowmeter 30 and filter 31 is a source of pure methane 32 in the gaseous state and stored at room temperature. Here again, the filter 31 is similar to the filter 25 and is used to filter the moisture from the methane. A pure hydrogen supply 33 in the gaseous state and at room temperature is connected to the input tube 22 by way of valve 34, flowmeter 35 and filter 36. The hydrogen supply 33 is also connected by way of valve 37, valve 38, filter 36 and flowmeter 35 to a container 39 containing silicon tetrachloride and aluminum chloride, in solution 40. The hydrogen supply is further connected by way of filter 36, flowmeter 35, valve 41 and valve 42 to a container 43 containing phosphorus and silicon tetrachloride in solution 44. Means for heating the containers 39 and 43 are shown as electrical coils 45 and 46 respectively. The output tube 47 of container 39 is connected to the input tube 22 as is the output tube 48 of the container 43 connected to the input tube 22.

Although a carbon slab 15 is used in this illustration, it is to be noted that any metal may be used which may be heated to 2000° centigrade without deforming or giving off any impurities. In this illustration, carbon is used because in heating the carbon, atoms of carbon escape the slab and actually take part in the forming of the first layer of electroluminescent material. It is to be noted that as the carbon slab is heated, the higher the temperature the fewer carbon atoms condense and form a part of the electroluminescent material. Note that a temperature of around 1700° centigrade is the cross-over point, such that, at a temperature above 1700° centigrade all the carbon atoms actually do not condense but some carbon atoms leave the flask 10 in the form of gas by way of drain tube 13. The higher the temperature above 1700° centigrade, the fewer the carbon molecules that condense on the heated slab and take part in forming the electroluminescent material.

The process of forming the electroluminescent element is as follows: Using the apparatus described above and as shown in FIGURE 1, the valve 23 is turned on to pass the argon in the container 24 through the filter 25 and into the input tube 22. The only requirement on the rate of flow or pressure of the argon is that the flow of the argon into the flask 10 is sufficient to keep a pressure inside the flask higher than the pressure in the drain tube 13. The reason for this is that once the process has been started it is important that no impurities enter the flask 10 through the drain tube 13. The pure argon that is piped into the flask 10 is used as a flushing agent to flush all the vapor in the flask out the drain tube 13 including any water vapor and nitrogen which may be in the flask 10. Pure hydrogen gas may be used in place of the argon and in this illustration the hydrogen gas is actually used in the second flushing step as will be described below. The flow of argon is continued until the majority of water vapors and nitrogen in flask 10 are removed. The time required depends upon the size of the flask and the amount of vapor initially present in the flask. It has been found that a volume of argon equal to two or three times the volume of the chamber inside the flask is sufficient to flush the flask of the majority of vapors.

The next step is to continue the flow of argon gas and open the valve 34 which causes a flow of hydrogen from the container 33 to pass through the filter 36 to the input tube 22 and on into the flask 10. Therefore, hydrogen and argon are flowing through the input tube 22 into the flask 10. Once the hydrogen has reached the sufficient rate of flow to keep the pressure inside the flask higher than the pressure in the drain 13, the argon flow may be shut off by valve 23. If desired, the argon flow may be continued throughout the process without affecting the material formed because the argon is an inert gas and very stable and will not take part in the forming of the electroluminescent material. The carbon slab is heated to approximately 1800° centigrade. This temperature may range from 1750° to 1850° centigrade. The heating of the carbon and the admittance of the hydrogen into the flask 10 provides a further cleaning action to make certain that there is no oxygen or nitrogen present. The rate of flow of hydrogen again depends upon the size of the flask and the size of the slab. For a flask having a volume of approximately 250 cubic inches, a safe rate of flow of hydrogen is 3 to 4 cubic feet per hour. If there is oxygen present, it combines with the hydrogen to form water and then is boiled off in the form of vapor because of the heating of the carbon slab. It is possible to use oxygen to control the conductivity of the electroluminescent material. However, it is difficult to control the amount of oxygen quantitatively and therefore, in this illustration, the oxygen is not considered at all, except to make certain all the oxygen is removed from the flask. The hydrogen flow is continued until all the oxygen and water are completely removed from the flask 10. The time required depends on the rate of flow of hydrogen and the size and contamination of the flask 10. With the 250 cubic inch flask, the hydrogen is admitted for approximately fifteen minutes.

In the next step, the hydrogen flow into the flask is continued by way of valve 34 and input tube 22. The carbon is still maintained at approximately 1800° centigrade, but again, the temperature could range from 1750° to 1850° centigrade. With the valve 34 still passing hydrogen, the valve 29 is turned on to allow the methane in the container 32 to pass through the moisture filter 31 and on to the input tube 22. Both the hydrogen and the methane are flowing through the input tube 22 and, again, the pressures of the gases flowing through input tube 22 must be maintained at a pressure sufficient to keep the pressure in the flask 10 higher than the pressure in the drain tube 13. A pressure of 2 centimeters of mercury above the atmospheric pressure, if the outlet drain is exposed to the atmosphere, is normally sufficient to keep unwanted gases out of the flask 10. The methane, in the gaseous state, comes out of the input tube 22 and passes over the heated carbon slab 15 and thereby decomposes and deposits a thin homogeneous layer of extra fine carbon over the carbon slab 15. In other words, the methane decomposing above the slab 15 fills up the pores of the carbon slab with more carbon and therefore provides a very fine smooth surface upon which the electroluminescent material can be deposited. The time required, again, depends upon the size of the carbon slab and the rate of flow of the methane and hydrogen. Note that the slab 15 must be heated to at least 1500° centigrade and hydrogen must be present in order to have the methane decompose. A check with a microscope will reveal when the smooth surface has formed. The microscope is normally used from outside the flask 10, with the slab 15 still in the flask 10, so as not to contaminate the inside of the flask 10. Any hydrocarbon in the gaseous state may be used in place of methane.

*Forming the first layer*

The valves 41 and 42 are opened so that the hydrogen in the container 33 is bubbled through the container 43 which contains silicon tetrachloride and phosphorus in solution. Note that the silicon tetrachloride and phosphorus solution in container 43 are maintained at a constant temperature, e.g., between 62 and 63 degrees centigrade. This is to provide silicon tetrachloride and phosphorus vapor which the gaseous hydrogen may pick up while it is bubbling through the solution on its way to the slab 15. The temperature of the silicon tetrachloride and phosphorus solution determines the pressure of the vapor and consequently the amount of vapor the hydrogen will carry to the flask 10. The higher the temperature the more silicon tetrachloride and phosphorus vapor will be carried to the flask 10. Once the hydrogen has had time to bubble through the silicon tetrachloride and phosphorus solution and form a continuous flow from the hydrogen supply to the input tube 22, the valve 34 may be closed. If the argon flow is continued throughout the complete process, the hydrogen may be shifted directly to the container 43 without the pressure in flask 10 dropping below the pressure in the drain tube 13. In this step, the temperature of the carbon slab is changed to, e.g., 1500° centigrade and maintained at this temperature plus or minus one percent. The constant temperature setting may be any temperature below 1700° centigrade and above 1500° centigrade, depending upon the amount of carbon atoms desired in the first layer of the electroluminescent material to be formed. However, the carbon slab must be heated to at least 1500° centigrade to have the silicon and carbon bind together. It is understood that once a temperature has been chosen for the step, it must be maintained within plus or minus one percent or there will not be a homogeneous distribution of the crystallites in the formed material. With the hydrogen passing through the silicon tetrachloride and phosphorus solution, the hydrogen under pressure and the silicon tetrachloride and phosphorus solution heated to maintain a pressure within the flask, the hydrogen takes on a certain amount of the silicon tetrachloride and phosphorus vapor. The temperature causes an even flow of hydrogen with a certain amount of silicon tetrachloride and phosphorus vapor taken away with the flow of hydrogen. Note that the flow of methane is continued and the ratio of the hydrogen flow to the methane flow is two parts of hydrogen to one part of methane. In the solution contained in the container 43 the ratio of the silicon tetrachloride to the phosphorus is $10^5$ atoms of silicon to one atom of phosphorus. The solution in container 43 may be prepared in any number of ways as long as the above ratio of atoms is obtained. One method of preparing the solution is to dissolve the phosphorus in a liquid having a lower boiling point than the silicon tetrachloride. Then the solution containing the phosphorus atoms is combined with the silicon tetrachloride and the unwanted liquid is boiled out leaving the desired silicon tetrachloride solution containing the phosphorus atoms. The ratio of silicon to phosphorus affects the conductivity of the first layer of electroluminescent material. If the silicon content is increased, with the phosphorus content remaining the same as well as the ratio of silicon to carbon remaining the same, the conductivity of the first layer is decreased and if the silicon content is decreased, the conductivity is increased. However, since it is desirable to work with low voltages, it is also desirable to have a very low voltage drop across the first layer of electroluminescent material. Hence, the content of phosphorus must be high enough to give the desired conductivity to the material but not so high as to produce a lag in current flow due to the decrease in the charge carrier mobility. Therefore, the above ratio of silicon tetrachloride to phosphorus is used.

Any element from the group phosphorus, arsenic and antimony may be used wherever phosphorus is mentioned. Likewise in the container 39, the aluminum may be replaced by gallium.

It can be seen then that there are three means of changing the conductivity of the first layer formed. One is in the temperature of the carbon slab, that is, the higher the temperature above 1700° centigrade, owing to sublimation, the less carbon will take part in the forming of the first layer of material. The second is in the flow of methane which contains carbon. If the ratio of the methane over the silicon tetrachloride is increased, then the carbon content will be increased thereby increasing the conductivity of the first layer. A third means of controlling the conductivity of the first layer is in the ratio of silicon tetrachloride to the phosphorus particles contained in the container 40. Note that with the methane flowing into the input tube 22 and hydrogen bubbling through the silicon tetrachloride and phosphorus solution, there is methane vapor containing carbon, and silicon tetrachloride vapor containing phosphorus along with hydrogen coming out of input tube 22. The methane deposits carbon on the slab and at the same time the silicon tetrachloride breaks down under the heat and in the presence of hydrogen into silicon molecules which are deposited also on the carbon slab and the chloride vapor passes out through the drain 13 because of the pressure maintained within the quartz flask. The phosphorus atoms are deposited along with the carbon and silicon molecules. The pressure is maintained by the gas flowing out of the input tube 22. With the methane and the hydrogen passing through the solution of silicon tetrachloride and phosphorus, the first layer of material on top of the smooth surface of the carbon slab is formed, the first layer of material containing phosphorus, silicon and carbon. The carbon is contributed by both the carbon slab, because of the heat, and the methane coming out of the input tube 22. The conductivity of this first layer is controlled, as stated above, by varying any one of the three variables. Note that once the operation has been started to form this first layer, the ratios are fixed and the conductivity is set. In other words, for the first layer it is desirable to have a homogeneous cross section of conductivity, that is, a homogeneous deposit of carbon molecules within the phosphorus and silicon buildup. In forming the first layer, the process can be shortened by increasing rate of flow of the gases, but always maintaining the same ratio of methane to hydrogen flow, or the process may be lengthened by decreasing the rate of flow of gases. The first layer may be made to any desired thickness, however, the layers are made as thin as possible, while still maintaining physical strength, so the material formed may be relatively transparent.

*Forming the second layer*

When the desired thickness of the first layer of the electroluminescent material has been formed, e.g., 100 micro inches or less in thickness, the valves 37 and 38 are opened and the valves 41 and 42 are closed allowing the filtered hydrogen from the container 33 to pass through the container 39 containing silicon tetrachloride and aluminum chloride in solution. The solution in container 39 is obtained by adding sufficient aluminum chloride to the silicon chloride to provide a ratio of one atom of aluminum to $10^5$ atoms of silicon. The ratio may be between one atom of aluminum to $10^6$ atoms of silicon. Note that the solution in container 39 is maintained at the same temperature as the temperature of the solution in container 43 by the heating coil 40. The temperature maintained is between 62 and 63 degrees centigrade. Again, the flow of methane to the input tube is maintained during the transition from the hydrogen flowing through the container 43 to the hydrogen flowing through the container 39. However, without the hydrogen present with the methane in the flask 10, the methane does not break down. Hence, it does not deposit any carbon atoms on the electroluminescent material being formed until the hydrogen is reintroduced into the flask along with the silicon tetrachloride and aluminum chloride vapors. The hydrogen, which is passing through the silicon tetrachloride and aluminum chloride, picks up the silicon tetrachloride and aluminum chloride vapors. When the gas passes over the carbon slab 15, it decomposes into silicon and aluminum atoms and the chloride vapor passes out the drain tube 13. The silicon and aluminum atoms are deposited on the carbon slab. Also, carbon atoms from the methane are deposited on the slab. The second layer of the electroluminescent material is now being formed. The second layer is composed of silicon-carbon molecules and aluminum atoms. Again, the carbon is the factor which determines the conductivity of the second layer. Since the carbon slab 15 is coated with the first layer the slab 15 does not give off an appreciable amount of carbon atoms. All the carbon in the second layer comes from the methane. It is desirable to have the second layer less conductive than the first layer. Hence, the temperature of the carbon slab during the forming of the second layer is maintained at a constant temperature, e.g., 1900° centigrade plus or minus one percent. Since the temperature of the carbon slab has been raised, the methane contributes less carbon molecules to the forming of the second layer. Note again, once the step has started the temperature must be maintained within plus or minus one percent so that the layer will be homogeneous in cross section with respect to carbon content, conductivity and the size of the crystallite. The second layer may be, for example, approximately two to five micro inches thick.

*Forming the third layer*

When the thickness of the second layer has been formed, the next step is started. That is, to form the third layer of material, the flow of gases is maintained the same as in forming the second layer of material. However, the temperature of the carbon slab is dropped, e.g. from 1900° centigrade to 1600° centigrade. By decreasing the temperature of the carbon slab 15, more atoms of carbon from the methane take part in the forming of the third layer of material, thereby increasing the conductivity of the third layer of material. Again, on the third layer of material, there is the silicon tetrachloride and aluminum chloride vapors carried by the hydrogen bubbling there through and the methane gas coming out of the input tube 22. The carbon in the methane is being deposited and the silicon and aluminum atoms are being deposited to form the third layer. The third layer of material may be the same thickness as the second layer of material, that is, from 2 to 5 micro inches thick.

In using the percentages and temperatures given in the above example, it is possible to form, by vapor deposition, an electroluminescent element comprising three layers. The first layer having a low resistivity, e.g., 5 ohms per cubic centimeter, the second layer having a high resistivity, e.g., $10^6$ ohms per cubic centimeter, and the third layer having, again, a low resistivity, e.g., less than 1 ohm per cubic centimeter. As far as the carbon content in the three layers is concerned, in the above example, the ratio of the carbon in the first layer to the silicon and phosphorus is in the ratio of two parts of silicon and phosphorus to one part of carbon. In the second layer, the ratio of the silicon and aluminum to the carbon is in the ratio of ten parts of silicon and aluminum to one part of carbon. And in the third layer, the ratio is two parts of silicon and aluminum to one part of carbon. So it can be seen, that the second layer of material has a fewer number of carbon molecules thereby making it less conductive. If an electrical current were placed across the cross section of the material, the current might in effect see first a resistor (first layer), then a capacitor (second layer), then another resistor (third layer).

FIGURE 2 illustrates the material formed, showing the three layers, 1, 2, and 3.

If another material is used in place of the carbon slab 15, the presence or absence of conductive molecules given off by that metal must be considered, and the ratio of the rate of flow of the methane and hydrogen changed accordingly to produce the desired conductivity in the first layer of electroluminescent material formed.

It can be seen now that the material formed by the above process has two conductive layers and one relatively nonconductive layer. When a positive electrode comes in contact with the first layer and a negative electrode comes in contact with the third layer of the electroluminescent material, the electrical current is distributed over both the first and third layers because of the conductivity of the material in the first and third layers. Now with the current passing from the first to the third layer, the current passes through the relatively nonconductive second layer and in doing so causes the electrons within the electroluminescent material to be displaced which, as well known in the art, causes the material to emit light. Note that if only the first and second layers are formed and a positive electrode connected to the first layer and a negative electrode connected to any one spot on the second layer, then the light emitted as a result of the current flowing through the electroluminescent material is localized to the point where the electrode touches the second layer. This is because the second layer is in effect nonconductive or at least less conductive than either the first or third layers. Hence, if it is not desirable to have the electroluminescent material transparent, then it is possible to lay a thin layer of conductive material, e.g., mesh copper, in place of the third layer as described in the process above.

Although the invention has been described and illustrated in detail, it is to be clearly understood that the same is by way of illustration and example only and is not to be taken by way of limitation, the spirit and scope of this invention being limited by the terms of the appended claims.

I claim:

1. An article comprising a base of a material selected from the class consisting of metal and carbon; and a luminescent material having a first layer adjacent said base composed essentially of carbon, an element selected from a first group consisting essentially of silicon and germanium, and an element selected from a second group consisting essentially of phosphorus, arsenic and antimony; and a second layer adjacent said first layer composed essentially of carbon, an element of said first group, and an element of a third group consisting essentially of aluminum and gallium.

2. An article comprising a base of a material selected from the class consisting of metal and carbon; and a luminescent material having a first layer adjacent said base composed essentially of carbon, an element selected from a first group consisting essentially of silicon and germanium, and an element selected from a second group consisting essentially of phosphorus, arsenic and antimony; a second layer adjacent said first layer composed essentially of carbon, an element of said first group, and an element of a third group consisting essentially of aluminum and gallium; and a third layer adjacent said second layer composed essentially of carbon, an element of said first group, and an element of said third group wherein the concentration of carbon in said third layer is greater than in said second layer.

3. The article of claim 2 wherein the concentration of carbon in said first layer and in said third layer is greater than said second layer.

4. An article comprising a base made of a carbon slab; and a luminescent material having a first layer adjacent said base composed essentially of carbon, phosphorus and silicon; and a second layer adjacent said first layer composed essentially of carbon, aluminum and silicon.

5. An article comprising a base made of a carbon slab; and a luminescent material having a first layer adjacent said base composed essentially of carbon, phosphorus and silicon; and a second layer adjacent said first layer composed essentially of carbon, aluminum and silicon; and a third layer adjacent said second layer composed essentially of carbon, aluminum and silicon, wherein the concentration of said carbon in said first layer and in said third layer is higher than in said second layer.

6. An article comprising a base of a material selected from the class consisting of metal and carbon; and a luminescent material having a first layer adjacent said base composed essentially of carbon and an element selected from a first group consisting essentially of phosphorus, arsenic, and antimony; a second layer adjacent said first layer composed essentially of carbon, gallium and germanium; and a third layer adjacent said second layer composed essentially of carbon, germanium and gallium wherein the concentration of carbon in said third layer is higher than in said second layer.

7. An article comprising a base of a material selected from the class consisting of metal and carbon; and a luminescent material having a first layer adjacent said base composed essentially of carbon, an element selected from a first group consisting essentially of silicon and germanium, and an element selected from a second group consisting essentially of phosphorus, arsenic and antimony; a second layer adjacent said first layer composed essentially of carbon, an element of said first group, and an element of a third group consisting essentially of aluminum and gallium; wherein the atom ratio of said elements in said first group to said elements in said second group, in said first layer, is about $10^5:1$ and the atom ratio of the elements in said first and second groups-to-carbon in said first layer is about 2:1, and wherein the atom ratio of said elements of said first group-to-said elements of said third group in said second layer is from about $10^5:1$ to about $10^6:1$, and the atom ratio of said elements of said first and third groups-to-carbon in said second layer is from about 10:1 to about 2:1.

8. The article of claim 7 wherein said layers are of a thickness of up to about 100 micro inches.

9. An article comprising a base of a material selected from the class consisting of metal and carbon; and a luminescent material having a first layer adjacent said base composed essentially of carbon, an element selected from a first group consisting essentially of silicon and germanium, and an element selected from a second group consisting essentially of phosphorus, arsenic and antimony; a second layer adjacent said first layer composed essentially of carbon, an element of said first group, and an element of a third group consisting essentially of aluminum and gallium; and a third layer adjacent said second layer composed essentially of carbon, an element of said first group, and an element of said third group, wherein the concentration of carbon in said third layer is greater than in said second layer; wherein the atom ratio of said elements in said first group-to-said elements in said second group, in said first layer, is about $10^5:1$ and the atom ratio of the elements in said first and second groups-to-carbon in said first layer is about 2:1, and wherein the atom ratio of said elements of said first group-to-said elements of said third group in said second layer is from about $10^5:1$ to about $10^6:1$ and the atom ratio of said elements of said first and third groups-to-carbon in said second layer is from about 10:1 to about 2:1; and wherein the atom ratios of said elements in said third layer bear the relationship and fall within the ranges stated for said second layer, and further wherein the concentration of carbon in said third layer is greater than the concentration of carbon in said second layer.

10. The article of claim 9 wherein said layers are of a thickness of up to about 100 micro inches.

11. An article comprising a base made of a carbon slab; and a luminescent material having a first layer adjacent said base composed essentially of carbon, phosphorus and silicon wherein the atom ratio of said silicon-to-said phosphorus is about $10^5:1$ and the atom ratio of said phosphorus and silicon-to-said carbon is about 2:1; and a second layer adjacent said first layer composed essentially of carbon, aluminum and silicon wherein the atom ratio of said silicon-to-said aluminum is from about $10^5:1$ to about $10^6:1$ and the atom ratio of said silicon and aluminum-to-said carbon is from about 10:1 to about 2:1.

12. An article comprising a base made of a carbon slab; and a luminescent material having a first layer adjacent said base composed essentially of carbon, phosphorus and silicon wherein the atom ratio of said silicon-to-said phosphorus is about $10^5:1$ and the atom ratio of said phosphorus and silicon to said carbon is about 2:1; and a second layer adjacent said first layer composed essentially of carbon, aluminum and silicon wherein the atom ratio of said silicon-to-said aluminum is from about $10^5:1$ to about $10^6:1$ and the atom ratio of said silicon and aluminum-to-said carbon is from about 10:1 to about 2:1; and a third layer adjacent said second layer composed essentially of carbon, aluminum and silicon, wherein the ratios of said atoms in said third layer bear the relationship and fall within the ranges stated for said second layer, and wherein the concentration of carbon in said third layer is greater than the concentration of carbon in said second layer.

13. The article of of claim 12 containing in addition a layer of carbon in between said carbon slab and said first layer.

14. The process of forming an electroluminescent material comprising: heating a base of a material selected from the class consisting of metal and carbon; passing a first gas over said metal for a first period of time, said first gas being made up of components containing atoms of carbon, an element selected from a first group consisting essentially of silicon and germanium, and an element selected form a second group consisting essentially of phosphorus, arsenic and antimony, said base being heated to a temperature sufficient to cause decomposition of gases passed thereover, thereby forming a first deposited layer of said elements on said base; and passing a second gas over said base for a second period of time, said second gas being made up of components containing atoms of carbon, an element of said first group, and an element selected from a third group consisting essentially of aluminum and gallium, said second gas decomposing over said heated base to form a second deposited layer of said carbon and said elements of said first and said third groups adjacent said first layer.

15. The process of forming an electroluminescent material comprising: heating a base of material selected from the class consisting of metal and carbon; passing a first gas over said metal for a first period of time, said first gas being made up of components containing atoms of carbon, an element selected from a first group consisting essentially of silicon and germanium, and an element selected from a second group consisting essentially of phosphorus, arsenic and antimony, said base being heated to a temperature sufficient to cause decomposition of gas passed thereover, thereby forming a first deposited layer of said elements on said base; and passing a second gas over said base for a second period of time, said second gas being made up of components containing atoms of carbon, an element of said first group, and an element selected from a third group consisting essentially of aluminum and gallium, said second gas decomposing over said heated base to form a second deposited layer of said carbon and said elements of said first and said third groups adjacent said first layer, and passing a third gas over said base for a third period of time, said third gas being made up of components containing atoms of carbon, an element of said first group, and an element of said third group, and wherein the concentration of carbon atoms in said third gas is greater than in said second gas, said third gas decomposing over said heated base to form a third deposited layer, adjacent said second layer, of said carbon and said elements of said first and third groups wherein the concentration of said carbon in said third layer is greater than in said second layer.

16. The process of claim 15 wherein said base is maintained in an oxygen-free and moisture-free atmosphere.

17. The process of claim 15 wherein said base is maintained in an oxygen-free and moisture-free atmosphere and said gases are passed over said base in the presence of a hydrogen carrier gas.

18. The process of forming an electroluminescent material comprising: heating a base of a material selected from the class consisting of metal and carbon; passing a first gas over said metal for a first period of time, said first gas being made up of components containing atoms of carbon, an element selected from a first group consisting essentially of silicon and germanium, and an element selected from a second group consisting essentially of phosphorus, arsenic and antimony, said base being heated to a temperature sufficient to cause decomposition of gases passed thereover, thereby forming a first deposited layer of said elements on said base; and passing a second gas over said base for a second period of time, said second gas being made up of components containing atoms of carbon, an element of said first group, and an element selected from a third group consisting essentially of aluminum and gallium, said second gas decomposing over said heated base to form a second deposited layer of said carbon and said elements of said first and said third groups adjacent said first layer; wherein the atom ratio of said elements in said first group to said elements in said second group, in said first gas, is about $10^5:1$, and the atom ratio of the elements in said first and second groups-to-carbon in said first layer is about 2:1; and wherein the atom ratio of said elements of said first group-to-said elements of said third group in said second gas is from about $10^5:1$ to about $10^6:1$, and the atom ratio of said elements of said first and third groups-to-carbon in said second gas is from about 10:1 to about 2:1.

19. The process of claim 18 wherein said base is heated to a temperature from about 1500° C. to about 1900° C.

20. The process of forming an electroluminescent material comprising: heating a base of a material selected from the class consisting of metal and carbon; passing a first gas over said metal for a first period of time, said first gas being made up of components containing atoms of carbon, an element selected from a first group consisting essentially of silicon and germanium, and an element selected from a second group consisting essentially of phosphorus, arsenic and antimony, said base being heated to a temperature sufficient to cause decomposition of gases passed thereover, thereby forming a first deposited layer of said elements on said base; and passing a second gas over said base for a second period of time, said second gas being made up of components containing atoms of carbon, an element of said first group, and an element selected from a third group consisting essentially of aluminum and gallium, said second gas decomposing over said heated base to form a second deposited layer of said carbon and said elements of said first and said third groups adjacent said first layer; and passing a third gas over said base for a third period of time, said third gas being made up of components containing atoms of carbon, an element of said first group, and an element of said third group, said third gas decomposing over said heated base to form a third deposited layer, adjacent said second layer, of said carbon and said elements of said first and third groups wherein the concentration of said carbon in said third layer is greater than in said second layer; wherein the atom ratio of said elements in said first group to said elements in said second group, in said first gas, is about $10^5:1$ and the atom ratio of the elements in said first and second groups-to-carbon in said first gas is about 2:1; and wherein the atom ratio of said elements of said first group-to-said elements of said third group in said second gas is from about $10^5:1$ to about $10^6:1$, and the atom ratio of said elements of said first and third groups-to-carbon in said second gas is from about 10:1 to about 2:1, and wherein the atom ratios of said elements in said third gas bear the relationship and fall within the ranges stated for said second gas and further wherein the concentration of carbon in said third gas is greater than the concentration of carbon in said second gas.

21. The process of claim 20 wherein said base is heated during said second period of time to a temperature higher than the temperature to which said base is heated during said first period of time and during said third period of time.

22. The process of claim 20 wherein said base is heated during said second period of time to a temperature higher than the temperature to which said base is heated during said first period of time and during said third period of time and wherein said gases are passed over said base in the presence of a hydrogen carrier gas.

23. A process of forming an electroluminescent material comprising: heating a base made of carbon to a temperature of substantially 1500° C.; passing a first gas over said heated base for a first period of time, said first gas being made up of components containing atoms of carbon, silicon and phosphorus in proportions such that the atom ratio of said silicon-to-said phosphorus is about $10^5:1$, and the atom ratio of said silicon and phosphorus-to-said carbon is about 2:1 whereby said first gas decomposes over said heated base and thereby forms a first deposited layer of said atoms on said base; and passing a second gas over said base for a second period of time, said second gas being made up of components containing atoms of carbon, aluminum and silicon, wherein the atom ratio of said silicon-to-said aluminum is from about $10^5:1$ to about $10^6:1$, and the atom ratio of said silicon plus said aluminum-to-said carbon is from about 10:1 to about 2:1, whereby said second gas is decomposed over said heated base to form a second deposited layer of said carbon, silicon, and aluminum adjacent said first layer.

24. A process of forming an electroluminescent material comprising: heating a base made of carbon to a temperature of substantially 1500° C.; pasing a first gas over said heated base for a first period of time, said first gas being made up of components containing atoms of carbon, silicon and phosphorus in proportion such that the atom ratio of said silicon to said phosphorus is about $10^5:1$, and the atom ratio of said silicon and phosphorus-to-said carbon is about 2:1 whereby said first gas decomposes over said heated base and thereby forms a first deposited layer of said atoms on said base; and passing a second gas over said base for a second period of time, said second gas being made up of components containing atoms of carbon, aluminum and silicon, wherein the atom ratio of said silicon-to-said aluminum is from about $10^5:1$ to about $10^6:1$, and the atom ratio of said silicon plus said aluminum-to-said carbon is from about 10:1 to about 2:1, whereby said second gas is decomposed over said heated base to form a second deposited layer of said carbon, silicon, and aluminum adjacent said first layer; and passing a third gas over said heated base for a third period of time, said third gas being made up of components containing atoms of carbon, silicon, and aluminum wherein the proportion of said atoms in said third gas bear the relationship and are within the range given for said second gas, and further wherein the concentration of carbon in said third gas is greater than in said second gas.

25. The process of claim 24 wherein said base is heated during said second period to a temperature higher than the temperature during said first and said third period.

References Cited in the file of this patent

UNITED STATES PATENTS

| | | |
|---|---|---|
| 2,556,711 | Teal | June 12, 1951 |
| 2,701,216 | Seiler | Feb. 1, 1955 |
| 2,880,117 | Hanlet | Mar. 31, 1959 |